Patented Nov. 24, 1931

1,833,286

UNITED STATES PATENT OFFICE

MAX HAGEDORN AND ARMIN OSSENBRUNNER, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY

AMINO CELLULOSE DERIVATIVES

No Drawing. Application filed October 26, 1927, Serial No. 228,968, and in Germany October 30, 1926.

The invention relates to amino-cellulose derivatives containing substituents for the hydrogen of hydroxyl groups, preferably radicles of organic acids.

The new cellulose derivatives are soluble in organic solvents and have a pronounced affinity for the acid dyestuffs hitherto useful only for dyeing animal fibers. This property, united to their solubility, makes the new compounds technically valuable. They can be worked up to articles, such as films or threads which, in contrast with the products made from other cellulose derivatives and being dyed only with difficulty as, for instance nitrates, acetates or ethers of cellulose, can be easily dyed in fast tints. Other cellulose derivatives which are dyed with difficulty acquire the property of being easily dyed if in their working up they receive a small addition of the new amino-cellulose derivative.

The new compounds are obtainable by treating with an amine, such as a primary, secondary or tertiary amine of the aliphatic, aromatic, or araliphatic series, a cellulosic compound containing in its molecule the residue of an aryl sulfonic acid, such as, for instance, benzene sulfonic acid and, furthermore, organic substituents forming ester or ether groups. Or we may start from a cellulose ester of an aryl sulfonic acid, treat it with an amine and then introduce an organic ester or an ether group. The process may also be executed by reaction on a cellulose ester of an aryl sulfonic acid simultaneously with a tertiary amine and with an acidulating agent, preferably with highly active derivatives of organic acids comprising anhydrides and chlorides.

The following examples, the parts being by weight, illustrate the invention without limiting it:

Example 1.—100 parts of cellulose acetate, e. g. cellit, are dissolved in 240 parts of acetone, and a solution of 18 parts of toluene-4-sulfochloride in 80 parts of acetone is added. After addition of 5.5 parts of urea in 10 parts of water, while well stirring or kneading, a solution of 3.75 parts of sodium hydroxide in 10 parts of water slowly is added drop by drop. The stirring or kneading is continued during 5 hours. Then 50 parts of isoamylamine are added, and the mass is heated in an autoclave for 1 hour to 100° C. The reaction product is precipitated by water and washed during 15 hours with hot water. The cellulose ester formed dissolves in acetone, glacial acetic acid and mixtures of 9 parts of dichloromethane, trichloromethane or symmetrical tetrachloroethane with 1 part of ethanol. The ester is intensively dyed by hot solutions of acid wool dyestuffs.

Example 2.—In the Example 1 the same quantity of diethylamine or triethylamine is replaced for isoamylamine, the process being executed in the same manner. The cellulose ester thus obtained has the solubility indicated in Example 1.

Example 3.—100 parts of an alkali cellulose made of 30 parts of cotton are esterified in known manner, e. g. suspended in benzene, by means of benzene sulfonic acid chloride. The cellulose derivative is freed from benzene and salts by washing with alcohol and water in succession. Then the water is entirely displaced by glacial acetic acid and the mass is pressed until only 90 parts of acetic acid adhere. After addition of 0.3 parts of sulfuric acid dissolved in 30 parts of glacial acetic acid the mass is allowed to stand during the night. Then 39 parts and after 30 minutes 51 parts of acetic acid anhydride are added. After about 2 hours 7.5 parts of a mixture is added containing 1 mole of sulfuric acid on 9 moles of glacial acetic acid. After further 4 hours the reaction product is precipitated by water and washed. Its solution in a mixture of 9 parts of dichloromethane and 1 part of ethanol may be freed from undissolved fibers by filtration. The dry ester is heated in an autoclave with 61 parts of aniline for 3 hours at 160° C. The mass is poured into dilute hydrochloric acid, the reaction product settling out. It is soluble in acetone, glacial acetic acid, symmetrical tetrachloroethane and mixtures of 9 parts of di- or trichloromethane and 1 part of methanol. It is dyed by acid wool dyestuffs.

*Example 4.*—100 parts of the cellulose acetate toluene-4-sulfonate resulting by the process described in Example 1 are dissolved in acetone and heated in an autoclave with 100 parts of diphenylamine during 3 hours to 120° C. Then the cellulose ester is precipitated by water and worked up. It is soluble in acetone, glacial acetic acid, symmetrical tetrachloroethane and mixtures of 9 parts of di- or trichloromethane with 1 part of ethanol.

*Example 5.*—100 parts of cellulose-toluene-4-sulfonic acid ester, in known manner prepared from alkali cellulose are treated with 2000 parts of pyridine and 280 parts of benzoylchloride until complete dissolution has occurred. The mass is poured into water and the precipitated cellulose compound is filtered and washed with aqueous ammonia for separating small quantities of benzoic acid which are present. The new cellulose ester is soluble in symmetrical tetrachloroethane, pyridine and mixtures of 9 parts of di- or trichloromethane with 1 part of ethanol.

*Example 6.*—100 parts of the cellulose acetate toluene-4-sulfonate, prepared according to Example 1, are dissolved in acetone and heated in an autoclave during 3 hours to 140° C. with 100 parts of dimethylaniline. The reaction product is separated by pouring the mass into diluted hydrochloric acid. The new cellulose derivative worked up as shown above is soluble in acetone, glacial acetic acid and mixtures of 9 parts of di- or trichloromethane or symmetrical tetrachloroethane with 1 part of ethanol.

*Example 7.*—100 parts of cellulose-toluene-4-sulfonic acid ester are treated during 2 hours at 100° C. with 2000 parts of an aqueous solution of pyridine of 33 per cent strength. The reaction product is separated from the liquid by filtration, freed from pyridine by treating it with diluted hydrochloric acid and then freed from acid by washing with water. The adhering water then is displaced by glacial acetic acid and an acetylation is carried out according to Example 3. The new cellulose derivative is soluble in symmetrical tetrachloroethane and mixtures of 9 parts of acetone, di- or trichloromethane and 1 part of ethanol. It is well dyed by acid dyestuffs for wool.

What we claim is:

1. In the process of manufacturing products being readily dyed from cellulose derivatives the step which comprises acting with an amine upon a cellulose derivative containing organic radicles and at least one radicle of an arylsulfonic acid as substituents for the hydrogen of its hydroxyl groups.

2. In the process of manufacturing products being readily dyed from cellulose derivatives the step which comprises acting with an amine upon a cellulose ester derived both from an organic acid and from an arylsulfonic acid.

In testimony whereof we affix our signatures.

MAX HAGEDORN.
ARMIN OSSENBRUNNER.